United States Patent
Tyler

(10) Patent No.: US 10,272,615 B2
(45) Date of Patent: Apr. 30, 2019

(54) HEAD AND SYSTEM FOR CONTINUOUSLY MANUFACTURING COMPOSITE HOLLOW STRUCTURE

(71) Applicant: CC3D LLC, Coeur d'Alene, ID (US)

(72) Inventor: Kenneth Lyle Tyler, Coeur d'Alene, ID (US)

(73) Assignee: CC3D LLC, Coeur d'Alene, ID (US)

( * ) Notice: Subject to any disclaimer, the term of this patent is extended or adjusted under 35 U.S.C. 154(b) by 0 days.

(21) Appl. No.: 15/725,879

(22) Filed: Oct. 5, 2017

(65) Prior Publication Data
US 2018/0029279 A1    Feb. 1, 2018

Related U.S. Application Data

(63) Continuation of application No. 15/285,165, filed on Oct. 4, 2016, now Pat. No. 9,840,035, which is a
(Continued)

(51) Int. Cl.
*B29C 64/209* (2017.01)
*B33Y 30/00* (2015.01)
(Continued)

(52) U.S. Cl.
CPC .......... *B29C 64/209* (2017.08); *B29B 15/122* (2013.01); *B29C 35/0261* (2013.01); *B29C 35/0805* (2013.01); *B29C 48/001* (2019.02); *B29C 48/0022* (2019.02); *B29C 48/09* (2019.02); *B29C 48/152* (2019.02); *B29C 48/21* (2019.02); *B29C 48/30* (2019.02); *B29C 48/304* (2019.02); *B29C 48/32* (2019.02); *B29C 48/325* (2019.02); *B29C 48/33* (2019.02); *B29C 64/106* (2017.08); *B29C 64/264* (2017.08); *B29C 70/50* (2013.01); *B29C 70/52* (2013.01);
(Continued)

(58) Field of Classification Search
None
See application file for complete search history.

(56) References Cited

U.S. PATENT DOCUMENTS 3,286,305 A   11/1966   Seckel
3,331,725 A    7/1967   Mercer
(Continued)

FOREIGN PATENT DOCUMENTS

DE    4102257 A1    7/1992
EP    2589481 B1    1/2016
(Continued)

OTHER PUBLICATIONS

International Search Report dated Jul. 10, 2017 for PCT/US17/27338 to CC3D LLC Filed Apr. 13, 2017.
(Continued)

*Primary Examiner* — Matthew J Daniels
*Assistant Examiner* — Manley L Cummins, IV
(74) *Attorney, Agent, or Firm* — Ryan C. Stockett

(57) ABSTRACT

A head is disclosed for use with a manufacturing system. The head may have a housing that discharges a tubular structure, and a cure enhancer connected to the housing and selectively activated to cure the tubular structure during discharge from the housing. The head may also have a nozzle that discharges a fill material into the cured tubular structure.

18 Claims, 8 Drawing Sheets

Related U.S. Application Data continuation-in-part of application No. 15/130,207, filed on Apr. 15, 2016.

(51) Int. Cl.

| | | |
|---|---|---|
| B29C 64/264 | (2017.01) | |
| B29C 64/106 | (2017.01) | |
| B29C 70/52 | (2006.01) | |
| B29C 48/30 | (2019.01) | |
| B29C 48/00 | (2019.01) | |
| B29C 48/09 | (2019.01) | |
| B29C 48/21 | (2019.01) | |
| B29C 48/32 | (2019.01) | |
| B29C 48/33 | (2019.01) | |
| B29C 48/152 | (2019.01) | |
| B29C 48/325 | (2019.01) | |
| B29C 35/02 | (2006.01) | |
| B29C 35/08 | (2006.01) | |
| B29B 15/12 | (2006.01) | |
| B29C 70/50 | (2006.01) | |
| B29C 70/38 | (2006.01) | |
| B29C 48/25 | (2019.01) | |
| B29C 48/285 | (2019.01) | |
| B29L 23/00 | (2006.01) | |
| B05B 3/00 | (2006.01) | |
| B05B 3/10 | (2006.01) | |
| B05B 5/03 | (2006.01) | |
| B05B 5/04 | (2006.01) | |
| B05B 7/14 | (2006.01) | |
| B05B 13/06 | (2006.01) | |
| B05D 3/06 | (2006.01) | |
| B29K 105/08 | (2006.01) | |
| B29D 23/00 | (2006.01) | |

(52) U.S. Cl.
CPC .......... B29C 70/523 (2013.01); B33Y 30/00 (2014.12); *B05B 3/001* (2013.01); *B05B 3/1007* (2013.01); *B05B 5/032* (2013.01); *B05B 5/04* (2013.01); *B05B 7/1481* (2013.01); *B05B 13/0636* (2013.01); *B05D 3/061* (2013.01); *B29C 48/0012* (2019.02); *B29C 48/2665* (2019.02); *B29C 48/2886* (2019.02); *B29C 70/388* (2013.01); *B29C 70/521* (2013.01); *B29C 70/526* (2013.01); *B29C 2035/0827* (2013.01); *B29D 23/00* (2013.01); *B29K 2105/08* (2013.01); *B29L 2023/00* (2013.01); *B29L 2023/22* (2013.01)

(56) References Cited

U.S. PATENT DOCUMENTS

| | | | |
|---|---|---|---|
| 3,644,696 A | | 2/1972 | Magner et al. |
| 3,697,209 A | | 10/1972 | Schiesser |
| 3,809,514 A | | 5/1974 | Nunez |
| 3,873,024 A | | 3/1975 | Probst et al. |
| 3,984,271 A | | 10/1976 | Gilbu |
| 3,993,726 A | | 11/1976 | Moyer |
| 4,100,240 A | * | 7/1978 | Bassani .............. B29C 47/0004 138/174 |
| 4,344,808 A | * | 8/1982 | Healey, Jr. ............. H01H 69/02 138/174 |
| 4,515,737 A | * | 5/1985 | Karino ................ B29C 47/0023 156/172 |
| 4,643,940 A | | 2/1987 | Shaw et al. |
| 4,671,761 A | | 6/1987 | Adrian et al. |
| 4,822,548 A | | 4/1989 | Hempel |
| 4,851,065 A | | 7/1989 | Curtz |
| 5,002,712 A | | 3/1991 | Goldmann et al. |
| 5,037,691 A | | 8/1991 | Medney et al. |
| 5,041,713 A | | 8/1991 | Weidman |
| 5,059,375 A | * | 10/1991 | Lindsay .............. B29C 47/0023 264/167 |
| 5,120,380 A | * | 6/1992 | Strachan .............. B29C 70/025 156/164 |
| 5,128,084 A | | 7/1992 | Tompkins et al. |
| 5,139,710 A | | 8/1992 | Smith |
| 5,292,472 A | * | 3/1994 | Tompkins ........... B29C 47/0023 156/117 |
| 5,296,335 A | | 3/1994 | Thomas et al. |
| 5,340,433 A | | 8/1994 | Crump |
| 5,503,872 A | | 4/1996 | MacKenzie et al. |
| 5,746,967 A | | 5/1998 | Hoy et al. |
| 5,866,058 A | | 2/1999 | Batchelder et al. |
| 5,876,641 A | * | 3/1999 | LeClair .................. B29C 44/18 264/135 |
| 5,879,602 A | * | 3/1999 | Scheuring ............. B29B 15/122 264/136 |
| 5,936,861 A | | 8/1999 | Jang et al. |
| 6,042,765 A | | 3/2000 | Sugahara et al. |
| 6,053,214 A | * | 4/2000 | Sjoberg .................... B32B 1/08 138/134 |
| 6,153,034 A | | 11/2000 | Lipsker |
| 6,197,239 B1 | * | 3/2001 | Kirjavainen ............. F16L 9/121 264/209.2 |
| 6,459,069 B1 | | 10/2002 | Rabinovich |
| 6,501,554 B1 | | 12/2002 | Hackney et al. |
| 6,601,627 B2 | | 8/2003 | Kasai et al. |
| 6,934,600 B2 | | 8/2005 | Jang et al. |
| 7,795,349 B2 | | 9/2010 | Bredt et al. |
| 7,959,983 B1 | | 6/2011 | Farrar et al. |
| 8,221,669 B2 | | 7/2012 | Batchelder et al. |
| 9,126,365 B1 | | 9/2015 | Mark et al. |
| 9,126,367 B1 | | 9/2015 | Mark et al. |
| 9,149,988 B2 | | 10/2015 | Mark et al. |
| 9,156,205 B2 | | 10/2015 | Mark et al. |
| 2002/0009935 A1 | | 1/2002 | Hsiao et al. |
| 2002/0062909 A1 | | 5/2002 | Jang et al. |
| 2002/0113331 A1 | | 8/2002 | Zhang et al. |
| 2002/0165304 A1 | | 11/2002 | Mulligan et al. |
| 2003/0044539 A1 | | 3/2003 | Oswald |
| 2003/0056870 A1 | | 3/2003 | Comb et al. |
| 2003/0160970 A1 | | 8/2003 | Basu et al. |
| 2003/0186042 A1 | | 10/2003 | Dunlap et al. |
| 2003/0236588 A1 | | 12/2003 | Jang et al. |
| 2005/0061422 A1 | | 3/2005 | Martin |
| 2005/0104257 A1 | | 5/2005 | Gu et al. |
| 2005/0109451 A1 | | 5/2005 | Hauber et al. |
| 2005/0230029 A1 | | 10/2005 | Vaidyanathan et al. |
| 2007/0003650 A1 | | 1/2007 | Schroeder |
| 2007/0013096 A1 | * | 1/2007 | Rekret .................... B29C 39/18 264/45.5 |
| 2007/0096358 A1 | * | 5/2007 | Pelcz .................... A21C 11/16 264/209.8 |
| 2007/0228592 A1 | | 10/2007 | Dunn et al. |
| 2008/0176092 A1 | | 7/2008 | Owens |
| 2009/0095410 A1 | | 4/2009 | Oldani |
| 2009/0246384 A1 | | 10/2009 | Liao et al. |
| 2011/0032301 A1 | | 2/2011 | Fienup et al. |
| 2011/0052904 A1 | * | 3/2011 | Guarriello ................ B25G 1/10 428/319.3 |
| 2011/0143108 A1 | | 6/2011 | Fruth et al. |
| 2012/0060468 A1 | | 3/2012 | Dushku et al. |
| 2012/0231225 A1 | | 9/2012 | Mikulak et al. |
| 2012/0247655 A1 | | 10/2012 | Erb et al. |
| 2013/0092316 A1 | * | 4/2013 | Pakal .................... B29C 70/523 156/244.13 |
| 2013/0164498 A1 | | 6/2013 | Langone et al. |
| 2013/0209600 A1 | | 8/2013 | Tow |
| 2013/0233471 A1 | | 9/2013 | Kappesser et al. |
| 2013/0337265 A1 | | 12/2013 | Farmer |
| 2014/0061974 A1 | | 3/2014 | Tyler |
| 2014/0159284 A1 | | 6/2014 | Leavitt |
| 2014/0291886 A1 | | 10/2014 | Mark et al. |
| 2016/0031155 A1 | | 2/2016 | Tyler |
| 2016/0059481 A1 | | 3/2016 | Starodubtsev |
| 2017/0028623 A1 | | 2/2017 | Evans et al. |

(56) References Cited

U.S. PATENT DOCUMENTS

2017/0028633 A1 2/2017 Evans et al.
2017/0028635 A1 2/2017 Evans et al.
2017/0028644 A1 2/2017 Evans et al.

FOREIGN PATENT DOCUMENTS

| KR | 100995983 B1 | 11/2010 |
| KR | 101172859 B1 | 8/2012 |
| WO | 2013017284 A2 | 2/2013 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
A. Endruweit, M. S. Johnson, & A. C. Long, Curing of Composite Components by Ultraviolet Radiation: A Review, Polymer Composites, pp. 119-128 (Apr. 2006).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Invernizzi et al. UV-Assisted 3D Printing of Glass and Carbon Fiber-Reinforced Dual-Cure Polymer Composites, Materials 2016, 9, 583, doI:10.3390/ma9070583,
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/ Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

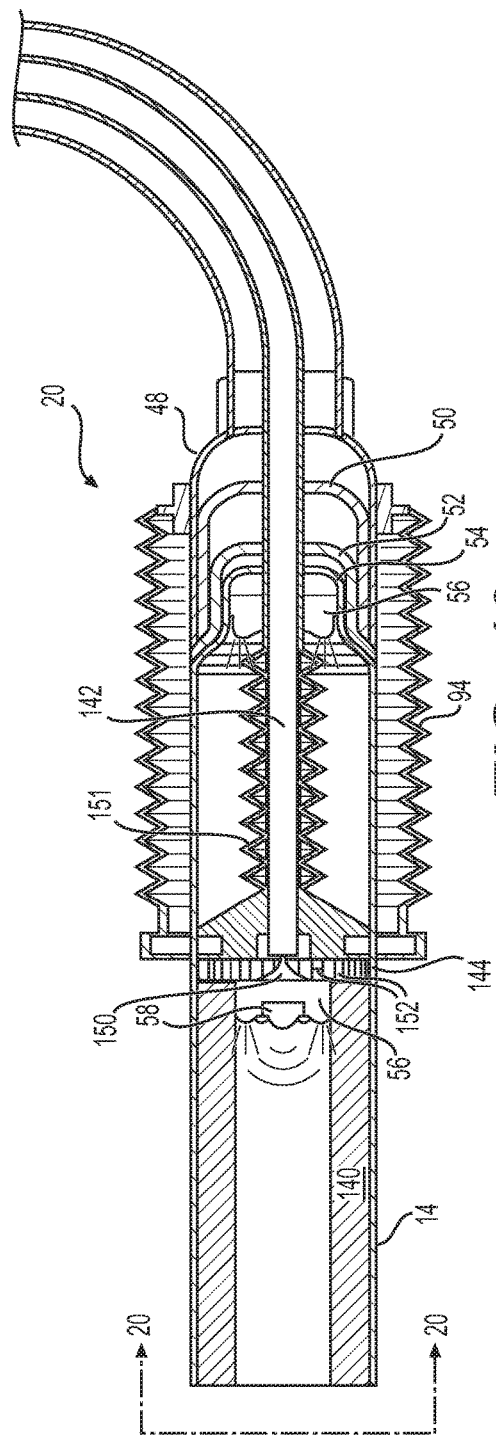
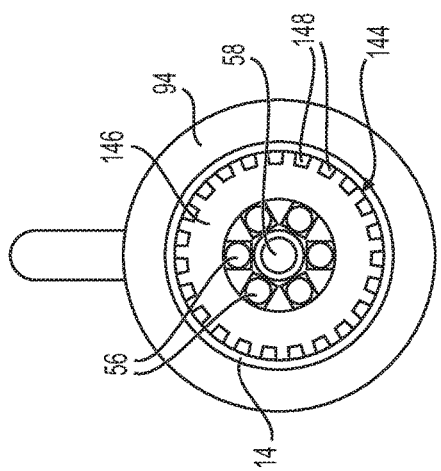
FIG. 19
FIG. 20

US 10,272,615 B2

HEAD AND SYSTEM FOR CONTINUOUSLY MANUFACTURING COMPOSITE HOLLOW STRUCTURE

RELATED APPLICATIONS

This application is a continuation of, and claims the benefit of priority to, application Ser. No. 15/285,165 that was filed on Oct. 4, 2016, the contents of which are expressly incorporated herein by reference.

TECHNICAL FIELD

The present disclosure relates generally to a manufacturing head and system, more particularly, to a head and system for continuously manufacturing composite hollow structures.

BACKGROUND

Extrusion manufacturing is a known process for producing continuous hollow structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The hollow structures produced by the extrusion manufacturing process may have any continuous length, with a straight or curved profile, a consistent cross-sectional shape, and excellent surface finish. Although extrusion manufacturing can be an efficient way to continuously manufacture hollow structures, the resulting structures may lack the strength required for some applications.

Pultrusion manufacturing is a known process for producing high-strength hollow structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The hollow structures produced by the pultrusion manufacturing process have many of the same attributes of extruded structures, as well as increased strength due to the integrated fibers. Although pultrusion manufacturing can be an efficient way to continuously manufacture high-strength hollow structures, the resulting structures may lack the form required for some applications. In addition, the variety of fiber patterns integrated within the pultruded hollow structures may be limited, thereby limiting available characteristics of the resulting hollow structures.

The disclosed system is directed to overcoming one or more of the problems set forth above and/or other problems of the prior art.

SUMMARY

In one aspect, the present disclosure is directed to a head for a manufacturing system. The head may include a housing that discharges a tubular structure, and a cure enhancer connected to the housing and selectively activated to cure the tubular structure during discharge from the housing. The head may also have a nozzle that discharges a fill material into the cured tubular structure.

In another aspect, the present disclosure is directed to a system for continuously manufacturing a composite structure. The system may include a support that moves in a plurality of directions during manufacturing of the composite structure, and a head coupled to the support. The head may include a housing that discharges a tubular structure, and a first cure enhancer connected to the housing and selectively activated to cure the tubular structure during discharge from the housing. The head may also include a nozzle that discharges a fill material into the cured tubular structure as the cured tubular structure passes over the nozzle, and a second cure enhancer that is selectively activated to cure the fill material. The head may a diverter that diverts the tubular structure radially outward around the nozzle.

BRIEF DESCRIPTION OF THE DRAWINGS

FIGS. 19 and 20 are cross-sectional and end-view perspective illustrations of an exemplary disclosed head that may be used in conjunction with the manufacturing systems of FIGS. 1 and 2.

DETAILED DESCRIPTION

Figure 1:
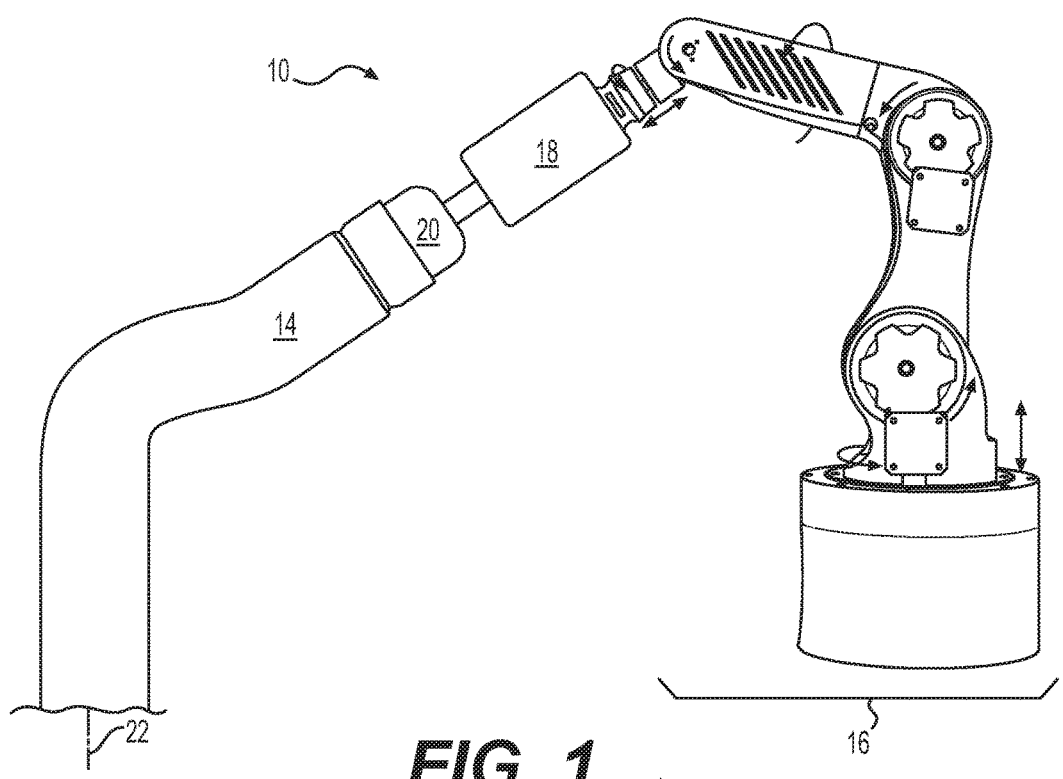
FIGS. 1 and 2 are diagrammatic illustrations of exemplary disclosed manufacturing systems.
Figure 2:
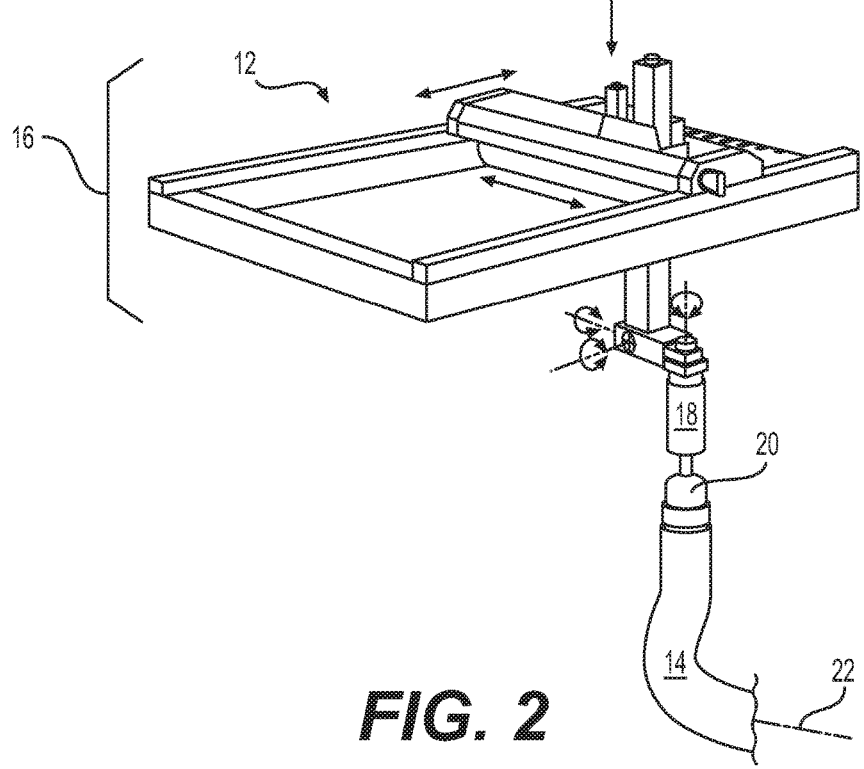

FIGS. 1 and 2 illustrate different exemplary systems 10 and 12, which may be used to continuously manufacture hollow composite structures (e.g., tubes, hoses, channels, conduits, ducts, etc.) 14 having any desired cross-sectional shape (e.g., circular or polygonal). Each of systems 10, 12 may include a support 16, a drive 18, and a head 20. Head 20 may be coupled to support 16 via drive 18. In the disclosed embodiment of FIG. 1, support 16 is a robotic arm capable of moving drive 18 and head 20 in multiple directions during fabrication of structure 14, such that a resulting longitudinal axis 22 of structure 14 is three-dimensional. In the embodiment of FIG. 2, support 16 is an overhead gantry also capable of moving head 20 and drive 18 in multiple directions during fabrication of structures 14. Although supports 16 of both embodiments are shown as being capable of 6-axis movements, it is contemplated that any other type of support 16 capable of moving drive 18 and head 20 in the same or a different manner could also be utilized, if desired.

Figure 3:
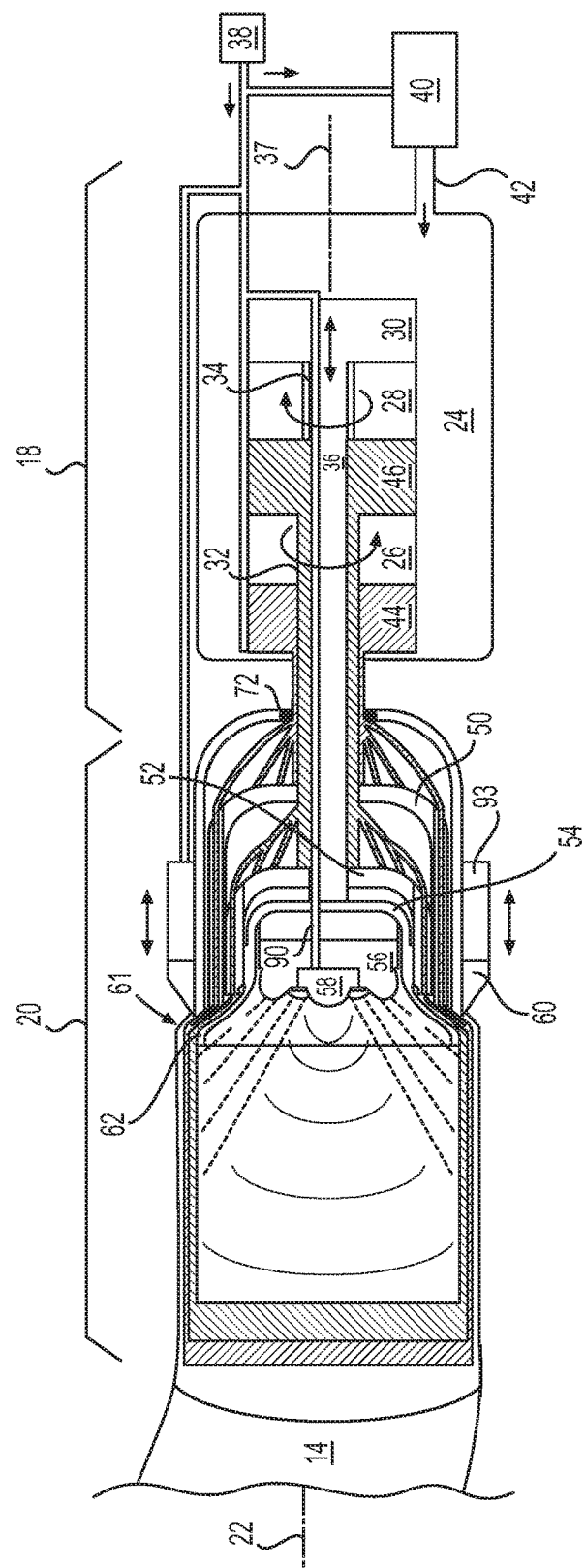
FIG. 3 is cross-sectional illustration of an exemplary disclosed drive and head that may be used in conjunction with the manufacturing systems of FIGS. 1 and 2.

As shown in FIG. 3, drive 18, in addition to functioning as a mechanical coupling between head 20 and support 16, may include components that cooperate to also supply power to head 20. These components may include, among other things, a container 24, one or more actuators disposed inside container 24, and a plurality of links connecting the various actuators to different portions of head 20. In the disclosed embodiment, three different actuators 26, 28, 30 are shown inside of container 24 as being coupled to head 20 by way of two different shafts 32, 34 and a rod 36. Actuators 26 and 28 may be rotary-type actuators (e.g., electric, hydraulic, or pneumatic motors), while actuator 30 may be a linear-type actuator (e.g., a solenoid actuator, a hydraulic cylinder, a lead screw, etc.). Shaft 32 may be tubular (i.e., cylindrical and hollow) and driven by actuator 26 to rotate about a center axis 37, and shaft 34 may pass through a center of shaft 32 and be driven by actuator 28 to also rotate about center axis 37. For the purposes of this disclosure, axis 37 may be considered a non-fiber axis of head 20. In the disclosed embodiment, shaft 34 is also tubular, and rod 36 may be configured to pass through a center of shaft 34 and be driven by actuator 30 to move axially in-and-out with respect to shaft 34. Rod 36 may also be generally aligned with center axis 37. It is contemplated that a different number of actuators could be coupled with head 20 by way of a different arrangement of shafts and/or rods, if desired. For example, a single actuator could be coupled to rotate both of shafts 32, 34 (e.g., by way of a gear train—not shown), if desired. Electricity may be provided to actuators 30-34 from an external supply (e.g., an established utility grid) 38.

In addition to functioning as a mounting location for the various actuators described above, container 24 may also function as a pressure vessel in some embodiments. For example, container 24 may be configured to receive or otherwise contain a pressurized matrix material. The matrix material may include any type of liquid resin (e.g., a zero volatile organic compound resin) that is curable. Exemplary resins include epoxy resins, polyester resins, cationic epoxies, acrylated epoxies, urethanes, esters, thermoplastics, photopolymers, polyepoxides, and more. In one embodiment, the pressure of the matrix material inside container 24 may be generated by an external device (e.g., an extruder or another type of pump) 40 that is fluidly connected to container 24 via a corresponding conduit 42. In another embodiment, however, the pressure may be generated completely inside of container 24 by a similar type of device. In some instances, the matrix material inside container 24 may need to be kept cool and/or dark in order to inhibit premature curing; while in other instances, the matrix material may need to be kept warm for the same reason. In either situation, container 24 may be specially configured (e.g., insulated, chilled, and/or warmed) to provide for these needs.

The matrix material stored inside container 24 may be used to coat any number of separate fibers and, together with the fibers, make up a wall of composite structure 14. In the disclosed embodiment, two separate fiber supplies 44, 46 are stored within (e.g., on separate internal spools—not shown) or otherwise passed through container 24 (e.g., fed from the same or separate external spools). In one example, the fibers of supplies 44, 46 are of the same type and have the same diameter and cross-sectional shape (e.g., circular, square, flat, etc.). In other examples, however, the fibers of supplies 44, 46 are of different types, have different diameters, and/or have different cross-sectional shapes. Each of supplies 44, 46 may include a single strand of fiber, a tow or roving of several fiber strands, or a weave of fiber strands. The strands may include, for example, carbon fibers, vegetable fibers, wood fibers, mineral fibers, glass fibers, metallic wires, etc.

The fibers from supplies 44, 46 may be coated with the matrix material stored in container 24 while the fibers are inside container 24, while the fibers are passing to head 20, and/or while the fibers are discharging from head 20, as desired. The matrix material, the dry fibers from one or both of supplies 44, 46, and/or fibers already coated with the matrix material may be transported into head 20 in any manner apparent to one skilled in the art. In the embodiment of FIG. 3, the matrix material is mixed with the fibers from both supplies 44, 46 (and in some cases, with fillers such as chopped fibers of varying lengths), and the matrix-coated fibers are then directed into head 20 via the open interior(s) of shaft(s) 32 and/or 34. It is contemplated, however, that dedicated conduits (not shown) could alternatively be used for this purpose, if desired. The matrix material may be pushed through shaft(s) 32, 34 (and/or the dedicated conduit(s)) by the pressure of container 24, and the fibers may travel along with the matrix material. Alternatively or additionally, the fibers (coated or uncoated) may be mechanically pulled through shafts 32 and/or 34, and the matrix material may be pulled along with the fibers in some embodiments. In the disclosed example, electricity is also supplied to head 20 by way of the empty interior(s) of shaft(s) 32 and/or 34.

Figure 4:
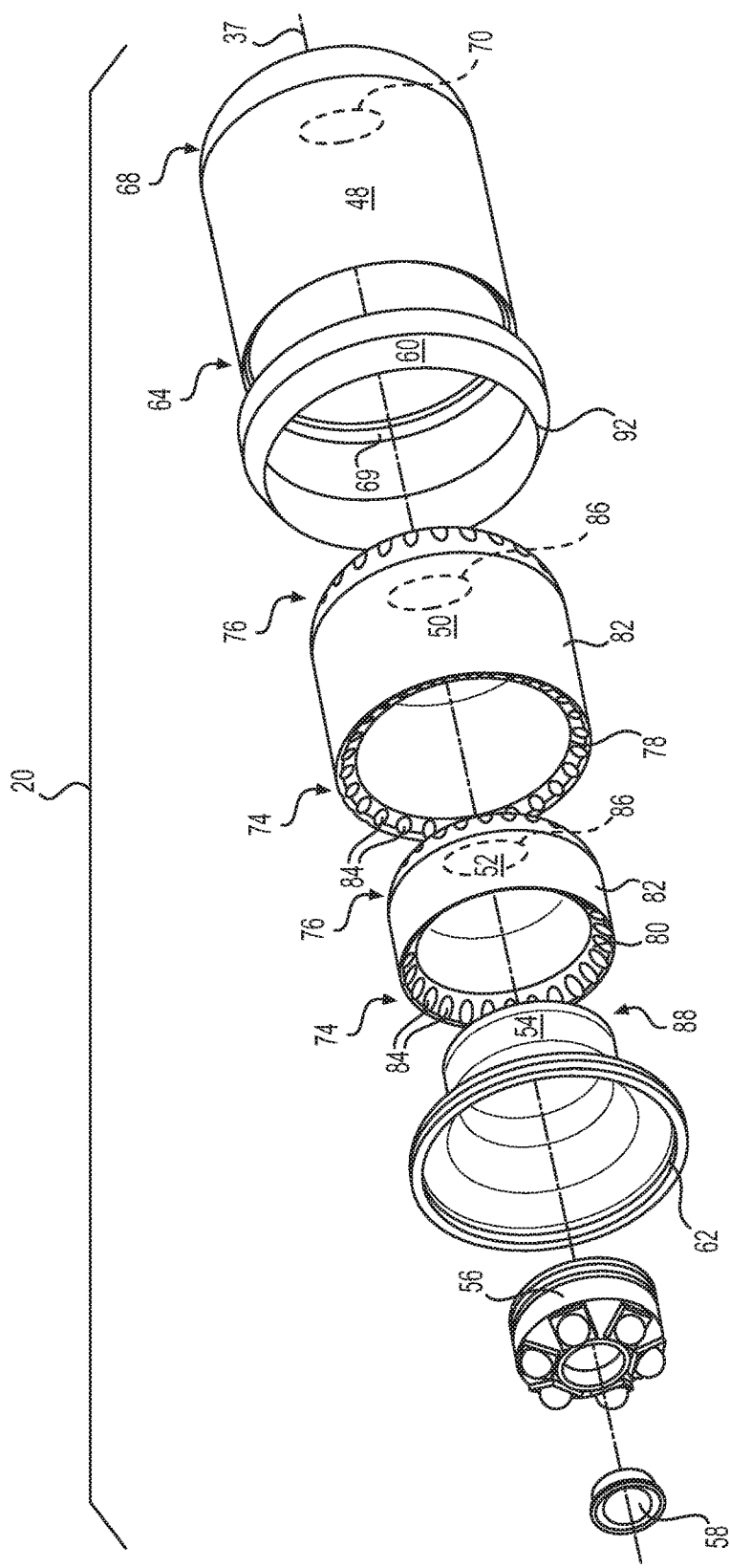
FIG. 4 is an exploded view illustration of the head of FIG. 3.

Head 20 may include a series of cylindrical components nested inside each other that function to create unique weave patterns in the walls of structure 14 out of the matrix-coated fibers received from drive 18. As seen in FIGS. 3 and 4, these components may include, among other things, a housing 48, one or more fiber guides (e.g., a first fiber guide 50 and a second fiber guide 52), a diverter 54, one or more cure enhancers (e.g., a UV light 56 and/or an ultrasonic emitter 58), and a cutoff 60. As will be explained in more detail below, matrix-coated fibers from drive 18 may pass through first and/or second fiber guides 50, 52, where a rotation in the fibers may be generated. The rotating matrix-coated fibers may then pass through an annular gap 61 (shown only in FIG. 3) between diverter 54 and housing 48 and around a mouth 62 of diverter 54, where the resin is caused to cure from the inside-out by way of UV light 56 and/or ultrasonic emitter 58.

Housing 48 may be generally tubular, and have an open end 64 (shown only in FIG. 4) and an opposing domed end 68. An inner diameter of housing 48 at open end 64 may be larger than outer diameters of fiber guides 50, 52, and an internal axial length of housing 48 may be greater than axial lengths of fiber guides 50, 52. With this arrangement, fiber guides 50, 52 may fit at least partially inside housing 48. In the disclosed embodiment, both fiber guides 50, 52 nest completely inside of housing 48, such that an axial face 69 of housing 48 at open end 64 extends past corresponding ends of fiber guides 50, 52. Face 69 of housing 48 at open end 64 may be convexly curved to mirror a correspondingly curved outer surface of diverter 54. A center opening 70 may be formed within domed end 68 of housing 48, allowing shaft 32, shaft 34, and rod 36 to pass axially therethrough. In some embodiments, a seal (e.g., an o-ring—shown only in FIG. 3) 72 may be disposed at opening 70 and around shaft 32 to inhibit liquid matrix material from leaking out of housing 48.

Fiber guides 50 and 52, like housing 48, may also be generally tubular and have an open end 74 and a domed end 76 located opposite open end 74. An inner diameter of fiber guide 50 at open end 74 may be larger than an outer diameter of fiber guide 52 at domed end 76, and an internal axial length of fiber guide 50 may be greater than an external axial length of fiber guide 52. With this arrangement, fiber guide 52 may fit at least partially inside fiber guide 50. In the disclosed embodiment, fiber guide 52 nests completely inside of fiber guide 50, such that an end face 78 of fiber guide 50 at open end 74 extends axially past an end face 80 of fiber guide 52. End faces 78 and 80 of fiber guides 50, 52 may be convexly curved to mirror the correspondingly curved outer surface of diverter 54.

Fiber guides 50 and 52 may each have an annular side wall 82 that extends from open end 74 to domed end 76. In the disclosed example, a thickness of each side wall 82 may be about the same (e.g., within engineering tolerances). However, it is contemplated that each side wall 82 could have a different thickness, if desired. The thickness of side walls 82 may be sufficient to internally accommodate any number of axially oriented passages 84. Passages 84 may pass from the corresponding end face (i.e., end face 78 or 80) completely through domed end 76. Each passage 84 formed in fiber guide 50 may be configured to receive one or more fibers from one of supplies 44, 46, while each passage 84 formed in fiber guide 52 may be configured to receive one or more fibers from the other of supplies 44, 46. It is contemplated that the same or a different number of passages 84 may be formed within each of fiber guides 50 and 52, as desired, and/or that passages 84 may have the same or different diameters. In the disclosed embodiment, twenty-four equally spaced passages 84 having substantially identical diameters are formed in each of fiber guides 50, 52. Because annular wall 82 of fiber guide 52 may have a smaller diameter than annular wall 82 of fiber guide 50, the equal spacing between passages 84 within fiber guide 52 may be different than the corresponding equal spacing between passages 84 within fiber guide 50. It should be noted that passage spacing within one or both of fiber guides 50, 52 could be unequally distributed in some embodiments. Because fiber guide 52 may nest completely inside fiber guide 50, the fibers passing through fiber guide 50 may generally be overlapped with the fibers passing through fiber guide 52 during fabrication of structure 14.

Each of fiber guides 50, 52 may be selectively rotated or held stationary during fabrication of structure 14, such that the fibers passing through each guide together create unique weave patterns (e.g., spiraling patterns, oscillating patterns, straight and parallel patterns, or combination patterns). The rotation of fiber guide 50 may be driven via shaft 32, while the rotation of fiber guide 52 may be driven via shaft 34. Shaft 32 may connect to domed end 76 and/or to an internal surface of fiber guide 50. Shaft 34 may pass through a clearance opening 86 in domed end 76 of fiber guide 50 to engage domed end 76 and/or an internal surface of fiber guide 52. As will be described in more detail below, the relative rotations of fiber guides 50, 52 may affect the resulting weave patterns of structure 14. In particular, the rotations of fiber guides 50, 52 may be in the same direction, counter to each other, continuous, intermittent, oscillating, have smaller or larger oscillation ranges, be implemented at lower or higher speeds, etc., in order to produce unique and/or dynamically changing weave patterns having desired properties. In addition, the rotations of fiber guides 50, 52 may be choreographed with the movements of support 16, with the movements of diverter 54, with an axial extrusion distance and/or rate, and/or with known geometry of structure 14 (e.g., termination points, coupling points, tees, diametrical changes, splices, turns, high-pressure and/or high-temperature areas, etc.).

Diverter 54 may be generally bell-shaped and have a domed end 88 located opposite mouth 62. Domed end 88 may have a smaller diameter than mouth 62 and be configured to nest at least partially within fiber guide 52. Mouth 62 may flare radially outward from domed end 88, and have an outer diameter larger than an outer diameter of fiber guide 52. In one embodiment, the outer diameter of mouth 62 may be about the same as an outer diameter of housing 48. Diverter 54, due to its outwardly flaring contour, may function to divert the fibers exiting passages 84 of both fiber guides 50, 52 radially outward. In this manner, a resulting internal diameter of structure 14 may be dictated by the outer diameter of diverter 54. In addition, diverter 54 may divert the fibers against face 69 of housing 48, thereby sandwiching the fibers within gap 61 (referring to FIG. 3). Accordingly, the diverting function of diverter 54, in addition to establishing the internal diameter of structure 14, may also dictate the wall thickness of structure 14. It is contemplated that, although diverter 54 has been described as being generally bell-shaped, diverter 54 could alternatively be cone-shaped, if desired.

In one embodiment, diverter 54 may be movable to selectively adjust the wall thickness of structure 14. Specifically, rod 36 may pass through clearance openings 86 of fiber guides 50, 52 to engage domed end 76 of diverter 54. With this connection, an axial translation of rod 36 caused by actuator 30 (referring to FIG. 3) may result in a varying width of gap 61 and a corresponding wall thickness of structure 14. Accordingly, thicker walls of structure 14 may be fabricated by pushing diverter 54 away from housing 48, and thinner walls may be fabricated by pulling diverter 54 closer to housing 48.

It is contemplated that particular features within the walls of structure 14 may be created by rapidly changing the width of gap 61 (i.e., by rapidly pulling diverter 54 in and rapidly pushing diverter 54 back out). For example, ridges (see FIG. 8), flanges (See FIG. 7), flexible sections, and other features may be created by adjusting the speed, duration, and/or distance of the pulling/pushing motions.

UV light 56 may be configured to continuously expose an internal surface of structure 14 to electromagnetic radiation during the formation of structure 14. The electromagnetic radiation may increase a rate of chemical reaction occurring within the matrix material discharging through gap 61, thereby helping to decrease a time required for the matrix material to cure. In the disclosed embodiment, UV light 56 may be mounted within mouth 62 of diverter 54 in general alignment with axis 37, and oriented to direct the radiation away from diverter 54. UV light 56 may include multiple LEDs (e.g., 6 different LEDs) that are equally distributed about axis 37. However, it is contemplated that any number of LEDs or other electromagnetic radiation sources could alternatively be utilized for the disclosed purposes. UV light 56 may be powered via an electrical lead 90 that extends from supply 38 (referring to FIG. 3) through shafts 32, 34 and rod 36. In some embodiments, rod 36 may itself function as electrical lead 90. The amount of electromagnetic radiation may be sufficient to cure the matrix material before structure 14 axially grows more than a predetermined length away from mouth 62. In one embodiment, structure 14 is completely cured before the axial growth length becomes equal to an external diameter of structure 14.

Ultrasonic emitter 58 may be used in place of or in addition to UV light 56 to increase the cure rate of the matrix material in structure 14. For example, ultrasonic emitter 58 could be mounted directly inside mouth 62 of diverter 54 or alternatively mounted to (e.g., within a corresponding recess of) a distal end of UV light 56. Ultrasonic emitter 58 may be used to discharge ultrasonic energy to molecules in the matrix material, causing the molecules to vibrate. The vibrations may generate bubbles in the matrix material, which cavitate at high temperatures and pressures, and force the matrix material to cure quicker than otherwise possible. Ultrasonic emitter 58 may be powered in the same manner as UV light 56, and also function to cure structure 14 from the inside-out. It is contemplated that, in addition to or in place of UV light 56 and/or ultrasonic emitter 58, one or more additional cure enhancers (not shown) could be located to help speed up a cure rate of structure 14 from the outside-in, if desired.

Cutoff 60 may be used to selectively terminate or otherwise fix a length of structure 14 during manufacturing thereof. As shown in FIGS. 3 and 4, cutoff 60 may be generally ring-like, and moveably mounted to an external surface of housing 48. Cutoff 60 may have a sharpened edge 92 that is configured to slide along axis 37 until it engages the matrix-coated fibers discharging through gap 61. Further sliding in the same direction may then function to shear the fibers against mouth 62, thereby fixing a length of structure 14. It should be noted that this shearing action may take place only while the matrix material is still uncured, such that a force required to push edge 92 through the fibers of structure 14 may be lower and a resulting cut surface may have a finer finish.

The axial movement of cutoff 60 may be generated by a dedicated actuator 93 (see FIG. 3). Actuator 93 may be mounted to housing 48 and embody a linear actuator (e.g., a hydraulic piston or a solenoid) or a rotary actuator (e.g., a motor that engages external threads on housing 48), as desired. Actuator 93 may receive electrical power from supply 38 via external wiring.

In some embodiments, the motion of cutoff 60 may be coordinated with the motion of diverter 54 during the fiber shearing of structure 14. For example, just prior to or during the axial movement of cutting edge 92 toward the fibers of structure 14, diverter 54 may be pulled inward toward housing 48 by rod 36 and actuator 30. By pulling diverter 54 inward, a wall thickness of structure 14 may be reduced and thereby made easier to shear. In addition, by pulling diverter 54 inward, a greater clamping force may be exerted on the fibers, thereby reducing the required shearing force and/or movement of cutting edge 92.

Figure 5:
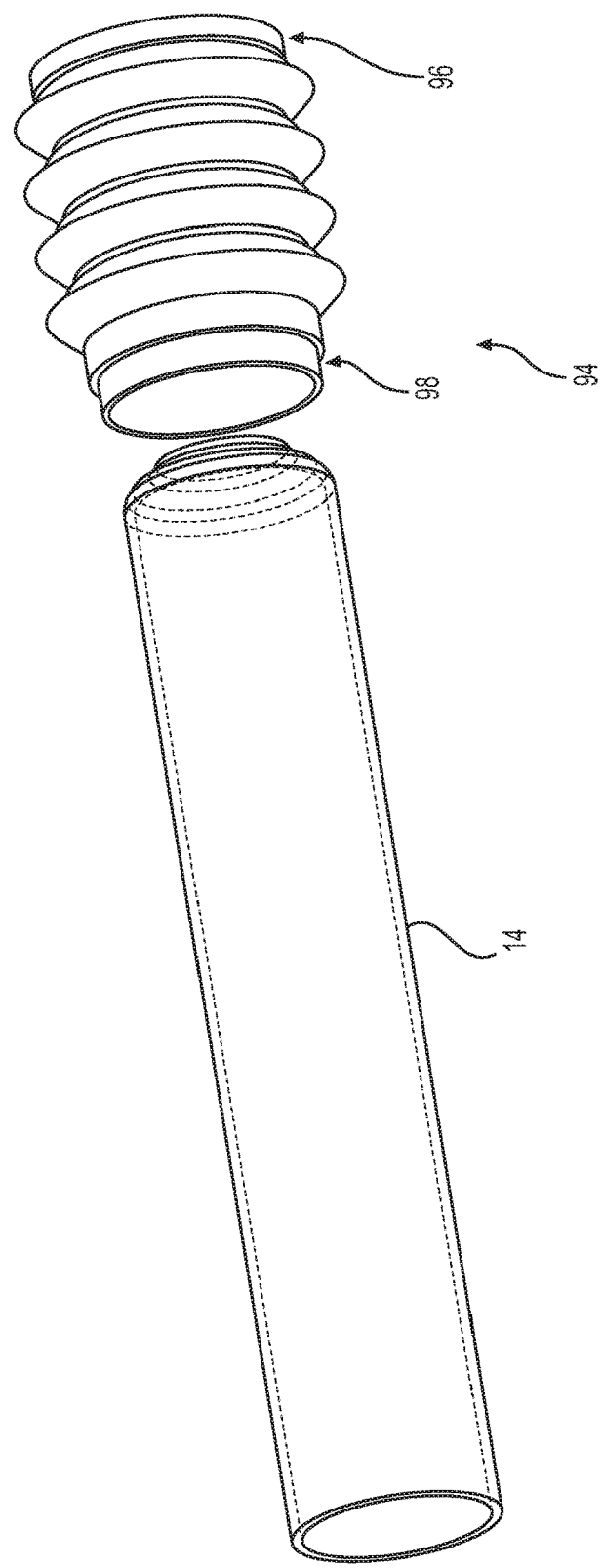
FIG. 5 is a perspective illustration of an exemplary disclosed shield that may be connected to the head of FIGS. 3 and 4.

Even though the matrix-coated fibers of structure 14 may be quickly cured after discharge through gap 61, the speed of this cure may be insufficient for some applications. For example, when manufacturing structure 14 under water, in space, or in another inhospitable environment of unideal (e.g., severe or extreme) temperatures, unideal pressures, and/or high-contamination, the matrix-coated fibers should be shielded from the environment until the cure is complete so as to ensure desired structural characteristics. For this reason, a shield 94 may be provided and selectively coupled to a distal end of head 20. An exemplary shield 94 is shown in FIG. 5 as including a tube 96 and/or a flexible coupling 98. Tube 96 may be selectively coupled alone to a distal end of head 20; coupling 98 may be selectively connected alone to the distal end of head 20; or tube 96 may be selectively coupled to the distal end of head 20 by way of coupling 98, as desired. Shield 94 may provide a more controlled environment for structure 14, allowing the matrix therein to cure by a desired amount prior to structure 14 extruding axially out past the end of shield 94. In some embodiments, shield 94 may be pressurized with an inert gas, pressurized with a gas that increases a cure rate of the matrix, and/or depressurized to more fully control the environment surrounding structure 14 during manufacture. Tube 96 may be used alone (i.e., without coupling 98) when axis 22 of structure 14 is primarily straight, while coupling 98 may be used alone or with tube 96 when axis 22 is three-dimensional. Coupling 98 may allow for structure 14 to bend and curve relative to axis 37 (referring to FIG. 3).

System 10 may be capable of producing many different weave patterns within the walls of structure 14. FIGS. 6-9 illustrate exemplary structures 14 that may be possible to manufacture with system 10. FIGS. 10-18 illustrate exemplary examples of weave patterns that may be used to make structure 14. FIGS. 6-18 will be discussed in more detail in the following section to further illustrate the disclosed concepts.

FIGS. 19 and 20 illustrate another exemplary embodiment of head 20 that may be used to manufacture structure 14. Like the embodiment of FIG. 3, head 20 of FIGS. 19 and 20 may include shafts 32, 34 (omitted from FIGS. 19 and 20 for clarity—shown in FIG. 3), rod 36 (omitted from FIGS. 19 and 20 for clarity—shown in FIG. 3), one or more fiber guides 50, 52, diverter 54, UV light 56, and/or ultrasonic emitter 58 disposed inside of housing 48. In some embodiments, head 20 of FIGS. 19 and 20 may also include shield 94 connected at a first end to housing 48 and engaged at an opposing second end with an outer surface of structure 14. However, in contrast the embodiment of FIG. 3, head 20 of FIGS. 19 and 20 may include additional components that cooperate to fill structure 14 with another material 140 during formation of structure 14. Material 140 may include, for example, insulation, shielding, rigid support, a liquid matrix, a particle reinforced matrix, a foam, a pressurized gas, concrete, or another filler known in the art.

The components of head 20 that cooperate to fill structure 14 with material 140 may include, among other things, a hollow wand 142 extending from housing 48 (e.g., through fiber guide 50, fiber guide 52, and diverter 54) along a center axis of structure 14 to the second end of shield 94, and a nozzle 144 operatively connected to the distal end of wand 142. Wand 142 may be rigid or flexible, and provided with material 140 at the first end, for example via an internal supply passage that is located inside of shafts 32, 34 rod 36. Nozzle 144 may be configured to discharge (e.g., to spray) material 140 axially and/or radially outward at a downstream location such that material 140 fills and/or sticks to the internal walls of structure 14.

In the embodiment of FIGS. 19 and 20, wand 142 is integral with head 20, such that head 20 may always be capable of filling structure 14 with material 140. However, it is contemplated that wand 142 could be removably connected to head 20, if desired. Similarly, nozzle 144 may be permanently or interchangeably connected to wand 142 such that different materials 140 and/or fill characteristics may be used.

Nozzle 144, in the exemplary embodiment of FIGS. 19 and 20, is configured to apply an inner annular layer or film of material 140 to internal surfaces of structure 14. In particular, nozzle 144 may include a disk-like body 146 having a plurality of orifices (e.g., square, round, oval, triangular, or other polygonal shaped orifices) 148 arranged around a periphery of body 146, a radial diverter 150 located at a general center of body 146, and a plurality of radially oriented internal passages 152 that extend from diverter 150 to orifices 148. With this configuration, material 140 advancing axially from wand 142 may impact diverter 150 and be pushed radially outward through passages 152 and orifices 148 to contact the internal surfaces of structure 14. Material 140 may have a consistency that allows it to stick to the internal surfaces at least long enough for curing of material 140 to be achieved. In some instances, material 140 exiting orifices 148 may flow upon discharge through orifices 148 and prior to curing, such that material 140 from each orifice 148 coalesces with material 140 from adjacent orifices 148 to form a continuous annular film. However, in other embodiments material 140 may not flow significantly upon discharge and prior to curing, such that separate axial ridges of material 140 are deposited and cured.

As described above, head 20 of FIGS. 19 and 20 may include UV lights 56 and/or ultrasonic emitter 58. These components, in addition to facilitating curing of structure 14 in the manner already described above, may also facilitate curing of material 140. In particular, a first UV light or set of lights 56 may be located around the first end of wand 142 (similar to the embodiment of FIG. 3) and configured to cure the liquid matrix of structure 14, while a second UV light or set of lights 56 may be mounted to an outer end face of nozzle 144 and configured to cure material 140 during discharge through orifices 148. In some instances, ultrasonic emitter 58 may also be attached to the exposed end face of nozzle 144, for example at a center of the second set of UV lights 56.

In some embodiments, an internal shield 151 may be connected to wand 142 and/or nozzle 144 (e.g., directly or indirectly via additional components) and located inside of shield 94. Internal shield 151 may help to seal off spaces around wand 142 and/or nozzle 144 to further isolate structure 14 from extreme environments at a time when the liquid matrix of structure 14 may not yet be sufficiently cured. Internal shield 151 may embody a baffle that tapers radially inward from an internal end face of nozzle 144 to engage an outer annular surface of wand 142, and extend axially from the internal end face of nozzle 144 to the first end of wand 142. It is contemplated that internal shield 151 may be omitted, if desired.

It is contemplated that the outer periphery of nozzle 144 may engage the inner annular surface of structure 14 or may terminate short of the inner annular surface, as desired. When the periphery of nozzle 144 engages the inner annular surface of structure 14, nozzle 144 may act as a guide in some instances. That is, structure 14 may slide over nozzle 144 in these instances and at a time when structure 14 is not yet fully cured. When this happens, nozzle 144 may actually help to shape structure 14. For example, nozzle 144 may be generally circular and help structure 14 to maintain a circular cross-sectional shape at a time when structure 14 might otherwise tend to sag. Alternatively, nozzle 144 may be rectangular, oval, triangular or another polygonal shape, and/or have a size that is generally larger or smaller than a size of diverter 54. In this way, nozzle 144 may be used to adjust the shape of structure 14 from what was originally extruded over diverter 54.

It is also contemplated that nozzle 144 could be selectively moved during the extrusion of structure 14 to vary and/or produce unique characteristics of structure 14. For example, wand 142 could be driven (e.g., via an actuator disposed in drive 18, like actuators 26, 28, and/or 30—referring to FIG. 3) to bend, rotate, and/or translate such that material 140 is deposited inside of structure 14 in spiraling configurations and/or with ridges, flanges, flexible sections, and other features.

Figure 21:
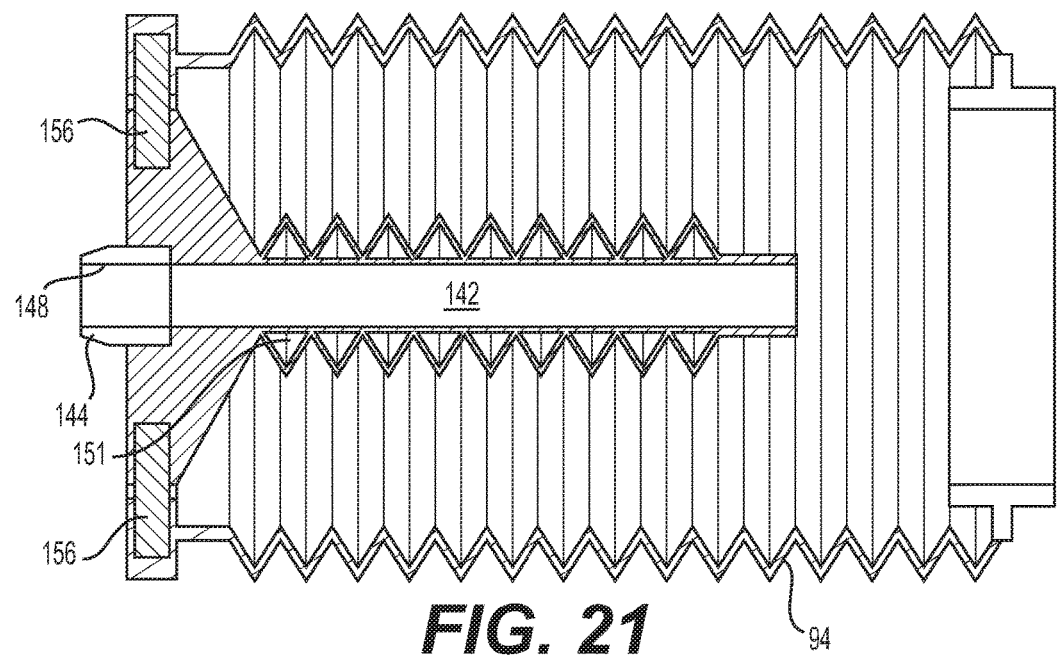
FIGS. 21 and 22 are cross-sectional and perspective illustrations of another exemplary disclosed head that may be used in conjunction with the manufacturing systems of FIGS. 1 and 2.
Figure 22:
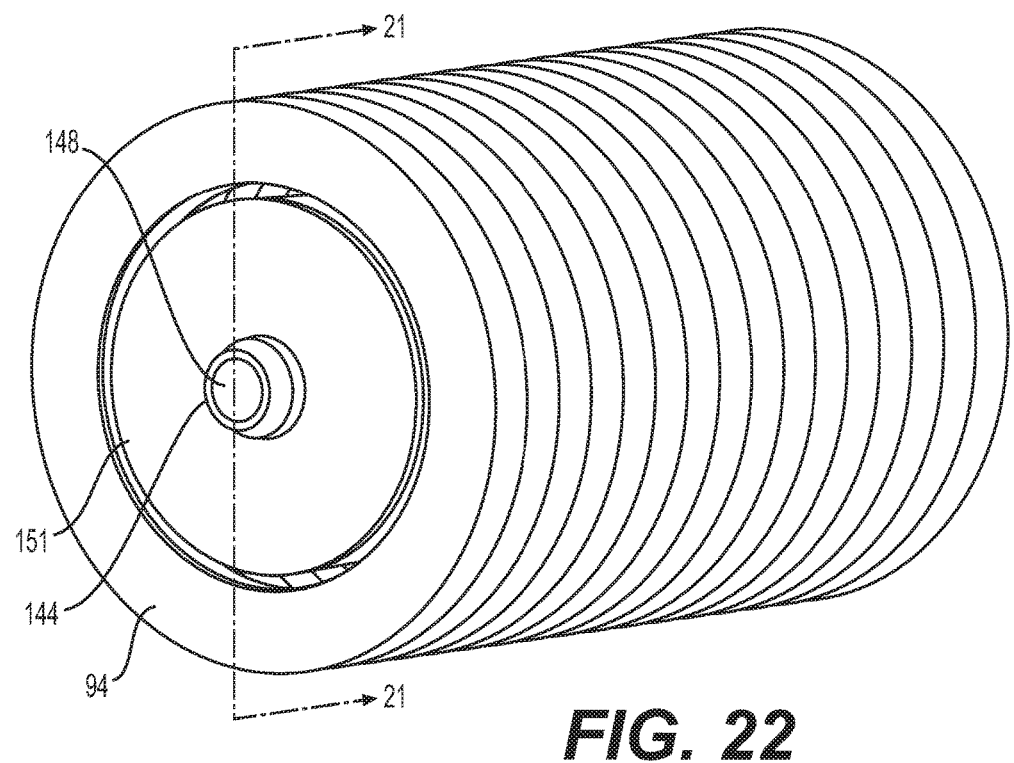

In an alternative embodiment shown in FIGS. 21 and 22, wand 142 and nozzle 144 have another mounting configuration. In particular, wand 142 and nozzle 144 may not be permanently connected to head 20 (not shown). Instead, wand 142, nozzle 144, and shield 94 may together form an attachment 154 that can be removably connected to head 20, much in the same way that a camera lense can be connected to a camera body. In this way, any number of different attachments 154 (e.g., attachments having different length wands 142, different nozzle shapes, etc.) can be interchangeably used with head 20 to produce a variety of different structures 14. The first end of wand 142 may be received within a corresponding socket of head 20 (e.g., a socket formed within the closed end of housing 48). Threaded fastening, compression coupling, or another form of connection may be used to secure wand 142 inside of the socket. Thereafter, a base end of shield 94 may simply slide over an outer annular surface of housing 48.

Nozzle 144 is shown in FIGS. 21 and 22 as having a different shape than in FIGS. 19 and 20. In particular, in the embodiment of FIGS. 21 and 22, nozzle 144 has a smaller diameter and a single centralized orifice 148. This configuration may be used to completely fill structure 14 with material 140 or to simply spray a coating of material 140 onto the internal surfaces of structure 14.

Because nozzle 144 of FIGS. 21 and 22 may not extend radially outward to engage or closely approach the inner annular surface of structure 14, it may be possible for nozzle 144 to move radially somewhat inside of structure 14 during trajectory changes of structure 14. While this radial movement may be acceptable in some situations, it may be undesired in other situations as it could result in uneven filling or coating of structure 14. For this reason, it is contemplated that a way to center nozzle 144 inside of structure 14 may be used in some situations. In one example, internal shield 151 may function as a centering device. In another example, one or more magnets 156 may be arranged within the distal end of shield 94 and configured to generate a magnetic field that interacts with nozzle 144 to urge nozzle 144 toward a general center of structure 14. Other devices may additionally or alternatively be used to center or otherwise locate nozzle 144 within structure 14, if desired.

INDUSTRIAL APPLICABILITY

The disclosed systems may be used to continuously manufacture composite structures having any desired cross-sectional shape and length. The composite structures may include any number of different fibers of the same or different types and of the same or different diameters. In addition, the weave patterns used to make the composite structures may be dynamically changed during manufacture of the structures. Operation of system 10 will now be described in detail.

At a start of a manufacturing event, information regarding a desired hollow structure 14 may be loaded into system 10 (e.g., into a controller responsible for regulating operations of support 16, actuators 26-28, and/or extruder 40). This information may include, among other things, a size (e.g., diameter, wall thickness, length, etc.), a contour (e.g., a trajectory of axis 22), surface features (e.g., ridge size, location, thickness, length; flange size, location, thickness, length; etc.), connection geometry (e.g., locations and sizes of couplings, tees, splices, etc.), desired weave patterns, and weave transition locations. It should be noted that this information may alternatively or additionally be loaded into system 10 at different times and/or continuously during the manufacturing event, if desired. Based on the component information, one or more different fibers and/or resins may be selectively installed into system 10. Installation of the fiber(s) may include threading of the fiber(s) through shafts 32, 34, through passages 84 in guides 50, 52, and through gap 61. In some embodiments, the fiber(s) may also need to be connected to a pulling machine (not shown) and/or to a mounting fixture (not shown). Installation of the matrix material may include filling of container 24 and/or coupling of extruder 40 to container 24. In some embodiments, depending on the gathered component information, diverters having larger or smaller diameters, and any number of different configurations of fiber guides may be selectively used with head 20.

The component information may then be used to control operation of system 10. For example, the fibers may be pulled and/or pushed along with the matrix material from head 20 at a desired rate at the same time that drive 18 causes fiber guides 50, 52 to rotate. During this rotation, diverter 54 may also be caused to move in or out, and any available cure enhancers (e.g., UV light 56 and/or ultrasonic emitter 58) may be activated to cure the matrix material. Support 16 may also be selectively moving head 20 in a desired manner, such that axis 22 of the resulting hollow structure 14 follows a desired trajectory. Once structure 14 has grown to a desired length, cutoff 60 may be used to sever structure 14 from system 10 in the manner described above.

Figure 6:
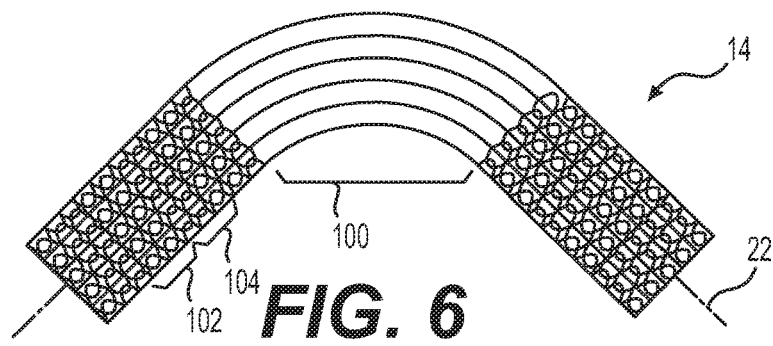
FIGS. 6-9 are diagrammatic illustrations of exemplary disclosed hollow structures that may be manufactured with the system of FIGS. 1 and 2.

FIG. 6 illustrates one example of structure 14 that may be produced by system 10. As can be seen in this figure, axis 22 of structure 14 may be translated and/or rotated (e.g., via corresponding movements of head 20) in any direction during the lengthwise growth of structure 14 to produce complex geometry. In addition, the weave pattern of structure 14 may be choreographed with the changing geometry. In the example of FIG. 6, an elbow has been created having multiple weave patterns that transition around a corner section 100. Specifically, the fibers passing through one of guides 50 or 52 oscillate at opposing ends of corner section 100, but straighten out (i.e., align with axis 22) inside of corner section 100. At the same time, the fibers passing through the other of guides 50 or 52 remain straight throughout the length of structure 14. In addition, a frequency of the oscillating fibers may vary. In particular, the oscillating fibers may oscillate at a slower frequency for a section 102, and then at a higher frequency for a section 104. This frequency-changing pattern may be repetitive in some applications.

It is contemplated that the weave pattern used at any particular point along the length of structure 14 may be selected in order to provide desired characteristics at the corresponding point. For example, oscillating patterns may be effectively used where slight movement and/or flexing of structure 14 is desired and/or expected over small and large distances. One application where oscillating patterns could be helpful may include the manufacture of a gas pipeline over arctic tundra for many continuous miles. In this application, the freezing and thawing of the tundra could cause undesired movements of the pipeline that must be accommodated in order to avoid cracking of the pipeline. The movements may be accommodated via the oscillating weave pattern. The oscillating weave pattern may also add toughness and or abrasion resistance to structure 14. The fibers within section 100 may all be parallel in order to produce a different characteristic within structure 14. For example, parallel fibers may provide for high static strength, where little or no bending is desired or expected.

Figure 7:
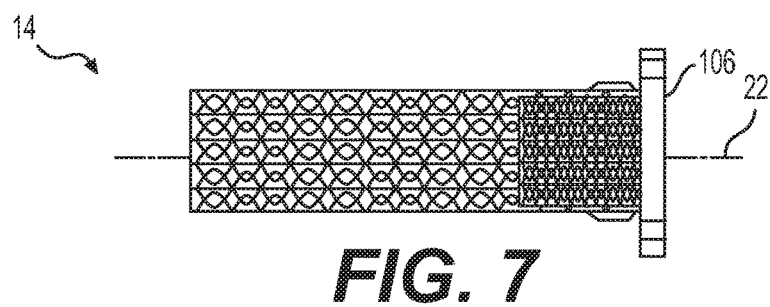

FIG. 7 illustrates another example of structure 14 that may be produced by system 10. As can be seen in this figure, a coupling 106 is used at a terminal end of structure 14 to connect structure 14 to another device (not shown) or to otherwise close off the end of structure 14. The use of coupling 106 may require different characteristics (e.g., greater strength or stiffness) in the walls of structure 14 and, thus, the weave pattern and/or thickness of structure 14 may change at the coupling location in a corresponding way. For instance, the weave pattern may become denser at this location and/or the wall thickness may increase. The weave pattern may become denser by increasing an oscillation frequency for a given axial growth rate (i.e., for a given extrusion rate) and/or by increasing an oscillation range. The wall thickness may increase at this location by causing diverter 54 to be pushed further away from housing 48, such that gap 61 becomes larger.

Figure 8:
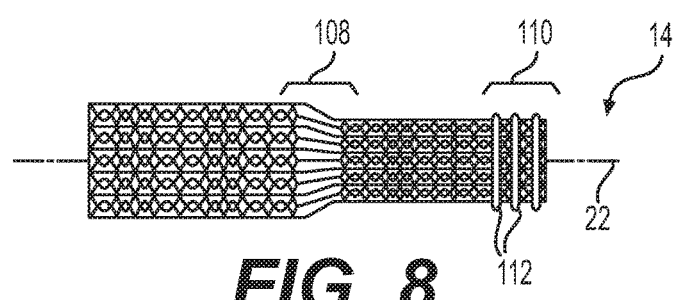

FIG. 8 illustrates another example of structure 14 that may be produced by system 10. As can be seen in this figure, the geometry of structure 14 changes (e.g., necks down) at a transition location 108 and at a terminal location 110. These geometry changes may involve corresponding changes in the weave pattern and/or in an outer profile of structure 14. For instance, the weave pattern at transition location 108 may change from oscillating and parallel fibers to only parallel fibers (or alternatively to only oscillating fibers). In addition, ridges 112 may be formed at terminal location 110 via the rapid in/out movements of diverter 54. The parallel fibers may enhance a rigidity at transition location 108, while ridges 112 may facilitate connection with another structure.

Figure 9:
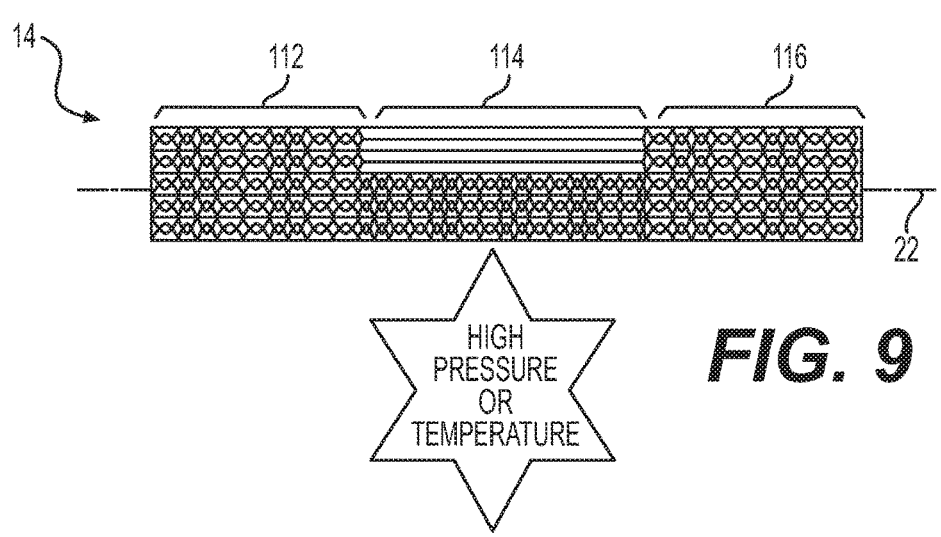

FIG. 9 illustrates a final example of structure 14 that may be produced by system 10. As can be seen in this figure, the geometry of structure 14 does not necessarily change. However, changes in the weave pattern of structure 14 may still be varied for application-specific purposes. In particular, a specific portion 114 of structure 14 may have different characteristics than other portions 116 of the same structure, even though all portions have the same general geometry. For instance, a greater resistance to temperature and/or pressure may be required within portion 114; a greater abrasion resistance may be required; and/or a greater flexibility and/or rigidity may be required. These characteristics may be provided by way of varying weave patterns. In the disclosed example, the weave pattern within portion 114 includes parallel fibers on only one section (e.g., one half) and a density of oscillating fibers on remaining sections that is different than a fiber density within portions 116.

Figure 10:
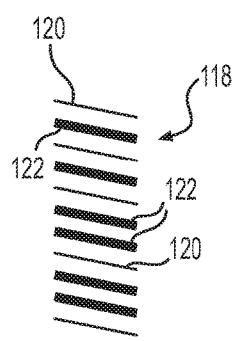
FIGS. 10-18 are diagrammatic illustrations of exemplary disclosed weave patterns that may make up walls of the hollow structures of FIGS. 6-9.

FIGS. 10-18 illustrate exemplary weave patterns that may be used at any location on any structure 14, regardless of structure 14 having changing geometry or characteristic requirements. In FIG. 10, a pattern 118 uses spiraling fibers 120 from guide 50 and spiraling fibers 122 from guide 52. At a top of pattern 118, fibers 120 may be equally interleaved with fibers 122 and may be identical fibers or fibers of different diameters, shapes, and/or sizes, as desired. About midway down pattern 118, however, the fibers may transition to a different weave, wherein two of fibers 122 are immediately adjacent each other. This new pattern may be achieved, for example, by increasing a rotational rate of guide 52 to be twice the rotational rate of guide 50.

Figure 11:
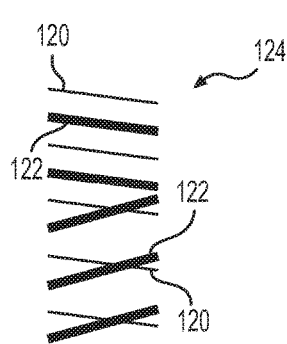
Figure 12:
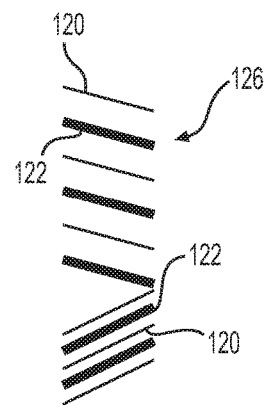
Figure 13:
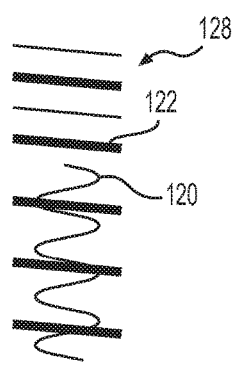

In FIG. 11, a pattern 124 is created that transitions from both of fibers 120, 122 spiraling in a first direction to one of fibers 120, 122 spiraling in a different direction. A similar pattern 126 is shown in FIG. 12, but instead of one of fibers 120, 122 transitioning to a different direction, both of fibers 120, 122 transition to the opposing direction. Another similar pattern 128 is shown in FIG. 13, but instead of only one of fibers 120, 122 transitioning to spiraling in a different direction, one of fibers 120, 122 transitions to oscillating rather than spiraling.

Figure 14:
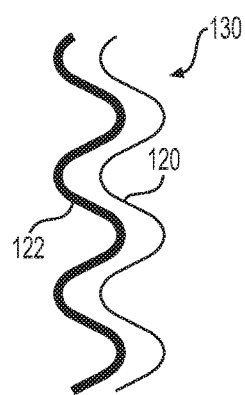
Figure 15:
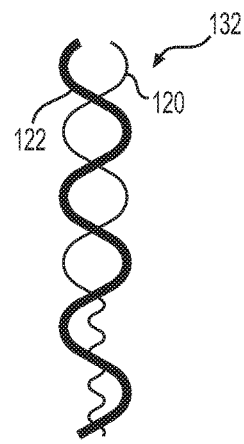
Figure 16:
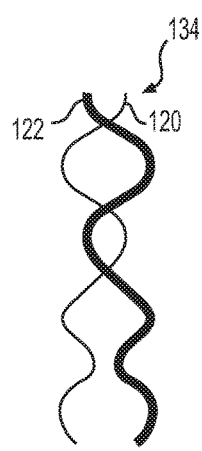

In FIG. 14, a pattern 130 is created that includes both of fibers 120 and 122 oscillating in a relatively synchronized manner Both oscillating fibers are oscillating at about the same frequency and through the same ranges. FIG. 15 shows a pattern 132, wherein fibers 120 and 122 are oscillating out of phase with each other using essentially the same frequency and range. However, one of fibers 120, 122 transitions about half-way along the length of pattern 132 to oscillate at a different frequency and/or through a different range. In FIG. 16, a pattern 134 is shown as having fibers 120 and 122 oscillating out of phase using the essentially same frequency and range. However, one or both of fibers 120, 120 may shift radial locations about half-way along the length of pattern 134 to move from being overlapping to being adjacent to each other.

Figure 17:
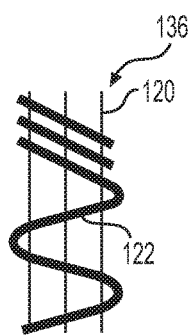
Figure 18:
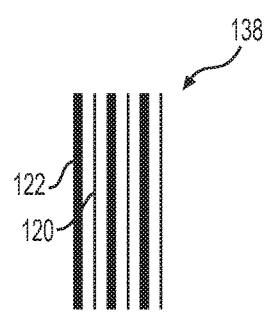

In a pattern 136 of FIG. 17, one of fibers 120, 122 is shown as being straight and generally aligned with axis 22 (referring to FIGS. 1 and 2), while the other of fibers 120, 122 is initially spiraling at an upper-half of pattern 136. The spiraling fiber 120 or 122 then transitions to oscillating at a lower-half of pattern 136. In a pattern 138 of FIG. 18, all of fibers 120, 122 are straight and aligned with axis 22, and equally interleaved with each other.

Regardless of the particular pattern of fibers 120, 122 included within structure 14 discharging from head 20, wand 142 and nozzle 144 may be utilized to at least partially fill structure 14 with material 140. For example, an annular layer of material 140 having a desired thickness, one or more straight or spiraling grooves, a thin coating, or a complete core of material 140 may be deposited and cured inside of structure 14. In addition, ridges, flanges, flexible sections, and other similar features may be created and/or augmented with material 140.

It will be apparent to those skilled in the art that various modifications and variations can be made to the disclosed system, structure, and weave patterns. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A head for a manufacturing system, comprising:
a housing that discharges a tubular structure;
a first cure enhancer connected to the housing, located inside of the tubular structure during discharge of the tubular structure, and selectively activated to cure the tubular structure during discharge from the housing;
a nozzle that discharges a fill material into the cured tubular structure; and
a second cure enhancer that is selectively activated to cure the fill material from inside of the cured tubular structure;
wherein the first and second cure enhancers are UV light cure enhancers.

2. The head of claim 1, wherein:
the tubular structure includes matrix-wetted continuous fibers; and
the first cure enhancer is configured to cure the matrix.

3. The head of claim 1, wherein the nozzle discharges the fill material as the cured tubular structure passes over the nozzle.

4. The head off claim 1, further including a fill material supply wand extending from the housing to the nozzle.

5. The head of claim 1, wherein the first cure enhancer is located inside of the housing and upstream of the nozzle relative to a discharge direction of the tubular structure.

6. The head of claim 1, wherein the second cure enhancer is located at an end of the nozzle opposite the housing.

7. The head of claim 1, further including a diverter that diverts the tubular structure radially outward around the nozzle.

8. The head of claim 7, wherein the diverter is located at least partially inside the housing.

9. The head of claim 7, wherein the first cure enhancer is located at least partially inside the diverter.

10. The head of claim 1, further including a drive that rotates the nozzle during discharge of the fill material.

11. The head of claim 1, wherein the nozzle is flexibly connected to the housing.

12. The head of claim 11, further including a centering device that centers the nozzle within the tubular structure during discharge of the fill material.

13. The head of claim 12, wherein the centering device is located radially outside of the tubular structure.

14. A system for continuously manufacturing a composite structure, comprising:
a support that moves in a plurality of directions during manufacturing of the composite structure; and
a head coupled to the support and including:
a housing that discharges a tubular structure;
a first cure enhancer connected to the housing, located inside of the tubular structure during discharge of the tubular structure, and selectively activated to cure the tubular structure during discharge from the housing;
a nozzle that discharges a fill material into the cured tubular structure as the cured tubular structure passes over the nozzle;
a second cure enhancer that is selectively activated to cure the fill material from inside of the cured tubular structure; and
a diverter that diverts the tubular structure radially outward around the nozzle.

15. The system of claim 14, wherein:
the tubular structure includes matrix-wetted continuous fibers; and
the fill material includes only a matrix.

16. The system off claim 14, further including a fill material supply wand extending from the housing to the nozzle.

17. The system of claim 14, wherein:
the first cure enhancer is located inside of the tubular structure and the housing at a location that is upstream of the nozzle relative to a discharge direction of the tubular structure; and
the second cure enhancer is located at an end of the nozzle opposite the housing.

18. The system of claim 17, wherein:
the nozzle is flexibly connected to the housing; and
the system further includes a centering device that centers the nozzle within the tubular structure during discharge of the fill material.

* * * * *